United States Patent [19]
Alon et al.

[11] Patent Number: 5,793,715
[45] Date of Patent: Aug. 11, 1998

[54] METHODS AND APPARATUS FOR REDUCING THE ACCESS TIME OF AN OPTICAL DRIVE

[75] Inventors: Amir Alon, Sunnyvale, Calif.; Shlomo Shapira, Petach-Tikva, Israel; Michael Naor, Rehovot, Israel; Jacob Finkelstein, Kfar Saba, Israel; Itzhak Katz, Petach-Tikva, Israel

[73] Assignee: Zen Research N.V., Curacao, Netherlands

[21] Appl. No.: 558,835

[22] Filed: Nov. 15, 1995

[51] Int. Cl.$^6$ ............................ G11B 17/22; G11B 7/00
[52] U.S. Cl. .................... 369/32; 369/44.28; 369/120
[58] Field of Search ................. 369/44.28, 44.37, 369/44.32, 44.27, 32, 120, 44.25, 44.26, 44.41, 30, 33; 360/78.01, 78.05, 78.14, 78.04

[56] References Cited

U.S. PATENT DOCUMENTS

| | | | |
|---|---|---|---|
| 4,460,988 | 7/1984 | Gordon | 369/32 |
| 4,486,870 | 12/1984 | Pettigrew et al. | 369/32 |
| 4,536,866 | 8/1985 | Jerome et al. | 369/112 |
| 4,646,280 | 2/1987 | Toyosawa | 369/50 |
| 4,674,070 | 6/1987 | Tajima et al. | 369/44.37 |
| 4,839,876 | 6/1989 | Fennema | 369/32 |
| 4,918,676 | 4/1990 | Miyasaka | 369/32 |
| 4,972,396 | 11/1990 | Rafner | 369/32 |
| 4,980,376 | 12/1990 | Abate et al. | 369/44.11 |
| 4,989,190 | 1/1991 | Kuroe et al. | 369/32 |
| 5,001,732 | 3/1991 | Nomura et al. | 377/3 |
| 5,081,617 | 1/1992 | Gelbart | 369/112 |
| 5,111,445 | 5/1992 | Psaltis et al. | 369/103 |
| 5,128,919 | 7/1992 | Narahara et al. | 369/97 |
| 5,150,347 | 9/1992 | Yanagi | 369/44.37 |
| 5,199,017 | 3/1993 | Kagami et al. | 369/44.28 |
| 5,210,726 | 5/1993 | Jackson et al. | 369/32 |
| 5,233,583 | 8/1993 | Reno | 369/44.26 |
| 5,239,530 | 8/1993 | Seo et al. | 369/54 |
| 5,245,597 | 9/1993 | Lee et al. | 369/44.28 |
| 5,274,507 | 12/1993 | Lee | 360/39 |
| 5,274,615 | 12/1993 | Rokutan et al. | 369/44.32 |
| 5,295,125 | 3/1994 | Oonishi et al. | 369/44.29 |
| 5,301,174 | 4/1994 | Matoba et al. | 369/44.28 |
| 5,313,448 | 5/1994 | Sukeda et al. | 369/121 |
| 5,361,245 | 11/1994 | Yoshida et al. | 369/44.28 |
| 5,394,386 | 2/1995 | Park et al. | 369/44.28 |
| 5,426,623 | 6/1995 | Alon et al. | 369/32 |
| 5,511,051 | 4/1996 | Rokutan et al. | 369/44.28 |

*Primary Examiner*—Paul W. Huber
*Attorney, Agent, or Firm*—Fish & Neave; Nicola A. Pisano; Michael J. DeHaemer

[57] ABSTRACT

Methods and apparatus are provided for improving optical drive access times using a detector having multiple sensing elements to sense and count disk tracks. The detector may be oriented either radially or tangentially with respect to the disk radius, and either capable of sensing more than one disk location simultaneously or have a length greater than the maximum distance between detectable features of the disk.

29 Claims, 8 Drawing Sheets

METHODS AND APPARATUS FOR REDUCING THE ACCESS TIME OF AN OPTICAL DRIVE

The invention relates generally to optical disk storage devices, and more particularly, to improving access time for such devices.

BACKGROUND OF THE INVENTION

Due to their high storage density, long data retention life, and relatively low cost, optical disks are becoming increasingly popular as a means to distribute information. The compact disk (CD) and mini disk (MD) formats were developed and marketed for the distribution of musical recordings. Recognizing the limitations of floppy disks for the distribution of large programs and data bases, the optical format was adapted for use as a high-capacity, read-only data storage medium (CD-ROM) in the personal computer field.

Even more recent developments in the application of optical disk technology, such as the MultiMedia CD (MMCD) developed by Sony Corp., the Super Density (SD) system developed by Toshiba Corporation, and the new Digital Video Disk (DVD) standard provide ever increasing storage capacities.

An optical disk is made of a transparent disk or substrate in which data, in the form of a serial bit-stream, is encoded as a series of pits in a reflective surface within the disk. The pits are arranged along a spiral or circular track. Data is read from the optical disk by focusing a low power laser beam onto a track on the disk and detecting the light reflected from the surface of the disk. Optical and imaging systems detect the reflected laser light and produce electrical signals which may be decoded to recover the digital data stored on the optical disk.

Data on an optical disk is arranged in sectors and tracks, where a sector is the portion of a track comprising the smallest independently addressable unit of data on the disk. Each sector holds a block of data and includes a header that contains track and sector numbers which are used to locate and identify specific blocks of data. For example, CD-ROM format disks use 2 Kb blocks of data stored along a continuous spiral track in the reflective surface of the disk.

Previously known optical storage devices generally require longer "access times" to retrieve stored data than comparable magnetic storage devices, with data transfer rates from the optical drive causing information bottlenecks in data intensive applications.

Access time depends upon two main factors: seek time and latency. Seek time is the time required to change the access mechanism (i.e., the optical pickup or "head") from a current configuration to a target configuration, where the configuration of the access mechanism may involve not only change in position, but also include changes, for example, in focusing, tracking and illumination. Latency refers to the delay that occurs, after the access mechanism is moved to its new position, while the optical disk is rotated to bring the desired sector into position where it can be read by the access mechanism.

In a typical previously known optical drive system, an address is read from a header on each disk track as the head moves across the disk from an initial position to a target track. Reading the address from the target track informs the drive that the head has properly been repositioned.

A number of previously known methods have been developed to improve access time over the system described above, for example, by reducing the seek time, the latency, or both. One such previously known approach reduces latency by increasing the disk angular velocity. This technique, however, may adversely impact access times for counting techniques, as described hereinbelow. Other methods involve the use of multiple heads positioned at numerous locations on the disk to reduce latency, but such solutions require means to control multiple heads, and increase the cost and complexity of the drive.

Still other previously known optical disk drives employ multi-step and counting methods. The multi-step method involves splitting the seek operation into a coarse (high speed) seek and a fine (low speed) seek. The coarse seek generally uses the velocity and acceleration characteristics of the head to predict how long to move the head, so that the head comes to rest near the target track. The fine seek operation then involves reading location information from the sector headers to adjust the head positioning to the target track. An example of a multi-step access method is described, for example, in U.S. Pat. No. 5,301,174.

Counting techniques sense each track crossed as the head changes from its initial position to its target position. As used herein, "sensing" refers to the process of imaging the disk surface and processing the detector signals only sufficiently to determine that some feature, such as a pit, has been detected, as distinguished from "reading", which involves processing the detector signals sufficiently to extract data stored on the disk.

These previously known methods, however, often fail to realize the potential for decreased access times. For example, in the multi-step techniques, the need to change modes from coarse to fine seek may impose a time penalty. Moreover, if a coarse seek does not bring the head close enough to its target position to accomplish a fine seek, for example, mainly due to eccentricity, an additional coarse seek may be necessary.

Likewise, counting techniques, to be accurate, must sense some feature on the disk surface (i.e., a portion of a pit) that indicates the presence of a track for every track crossed. Since the optical drive must rely on the sensing of data to count tracks, the speed at which the head may be repositioned may be limited by the disk data format and angular velocity.

For example, the CD-ROM format requires a minimum distance between pits of 0.9 um. and a maximum distance of 3.3 um (see Nakajima and Ogawa, *Compact Disk Technology*, translation by Aschmann, Ohmsha Ltd. Japan (1992), pp. 66). If the head is repositioned too quickly, the head may cross a track in an area that has no pits and may therefore fail to sense and count that track. A counting system intended to overcome this drawback is described, for example, in U.S. Pat. No. 5,394,386, but even this system may fail to accurately account for missed tracks if many tracks are missed.

In addition, as described in U.S. Pat. No. 5,283,776, disk eccentricity can cause counting errors by causing a head to temporarily reverse direction with respect to the tracks it is counting. That patent describes a method to correct counting errors caused by disk eccentricity by using direction detection techniques.

In view of the foregoing, it would be desirable to provide methods and apparatus for reducing access times in optical drive systems.

It would also be desirable to provide methods and apparatus for reliably sensing and counting tracks.

It would further be desirable to provide methods and apparatus for reducing latency in an optical drive system without increasing a disk's angular velocity and without requiring multiple heads.

SUMMARY OF THE INVENTION

In view of the foregoing, it is an object of the present invention to provide methods and apparatus for reducing access times in optical drive systems.

It is a further object of this invention to provide methods and apparatus for reliably sensing and counting tracks.

It is yet another object of the invention to provide methods and apparatus for reducing latency in an optical drive system without increasing a disk's angular velocity and without requiring multiple heads.

These and other objectives of the invention are accomplished by providing methods and apparatus that improve disk drive access times by employing a novel approach to count disk tracks. In accordance with the present invention, tracks are counted by sensing the tracks over a larger area of the disk than that sensed in previously known optical disk drives.

A device constructed in accordance with the principles of the present invention may use an accessing mechanism capable of sensing more than one disk track simultaneously. Alternatively, it may use an accessing mechanism that senses along a length of a track which is greater than the maximum distance between detectable features of the track.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

The present invention comprises novel apparatus and methods for improving the access time of optical disk storage devices. While the illustrative description provided herein is in the context of the CD-ROM format, it is to be understood that the present invention has wide applicability to optical drives for other formats, including the recently developed Super High density (SD), MultiMedia CDs (MMCD) and Digital Video Disk (DVD) formats. Moreover, it will be appreciated that the present invention may be readily employed in magneto-optical (erasable) as well as write-once-read-many (WORM) optical disk drives.

Figure 1:
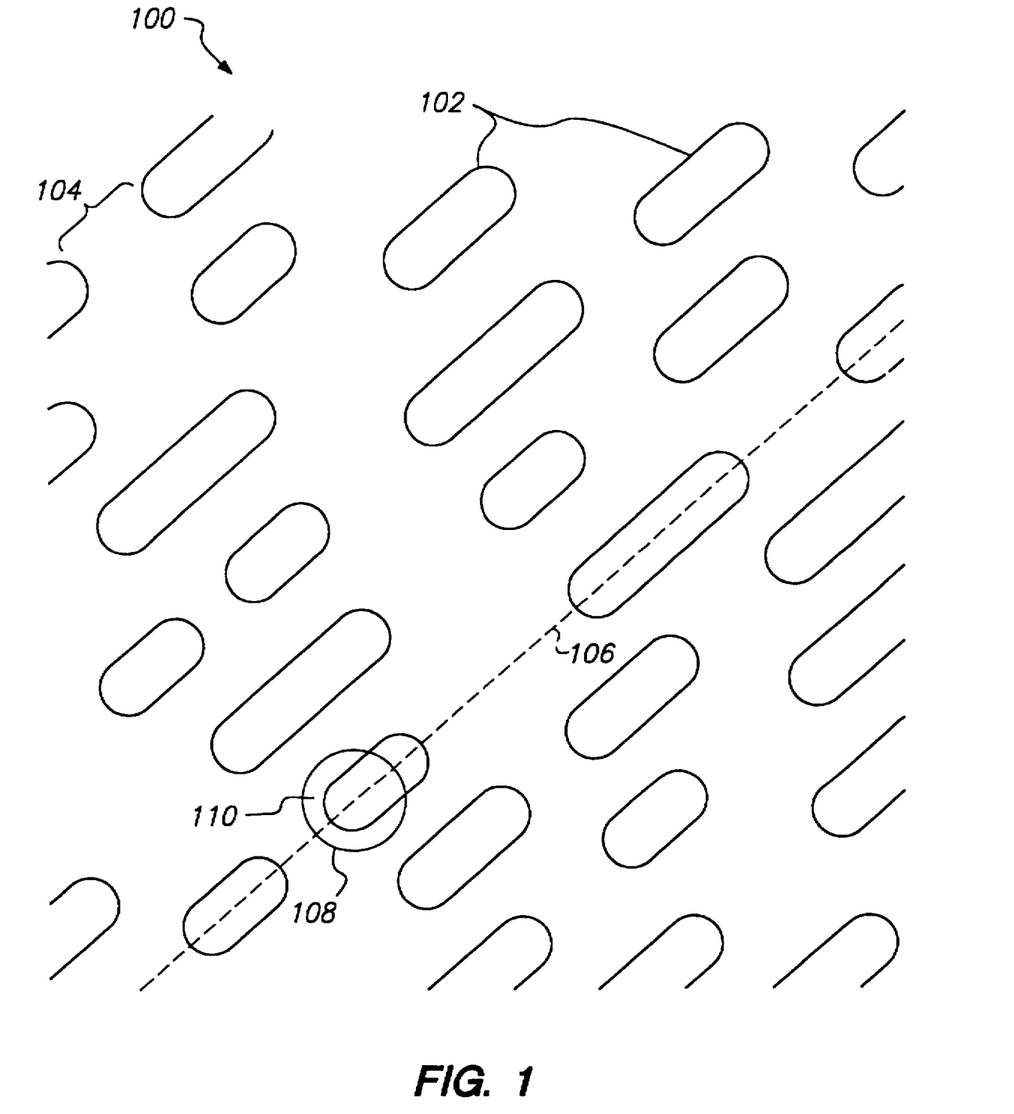
FIG. 1 illustrates a magnified view of the surface of a CD-ROM disk.

Referring to FIG. 1, a magnified view of the surface of optical disk 100, illustratively a CD-ROM disk, is described. Data is stored on disk 100 as pits 102 oriented along track 106, which may constitute a single continuous spiral data track, or one of many concentric circular data tracks. Pits 102 are separated from one-another by land 104. Different combinations of pit and inter-pit land lengths represent different data values. For example, for the CD-ROM format, the lengths of the pits and lands are limited to nine discrete values ranging from 0.9 um to 3.3 um, in accordance with International Standard 150/IEC 10149:1989(E).

Data is read from disk 100 by projecting light from an illumination source, typically a laser diode, onto the disk. An image 108 formed by the illumination reflected from disk 100, corresponding to imaged area 110 in FIG. 1, is then projected onto a detector (not shown) in the optical drive, which extracts the data encoded in the lengths of pits 102 and lands 104.

Most optical disk applications require the capability to reposition the access mechanism from one track to another track. For example, in the context of computer games and music recording, it may be desirable to access various visual and audio segments in a random order determined by the user.

Figure 2:
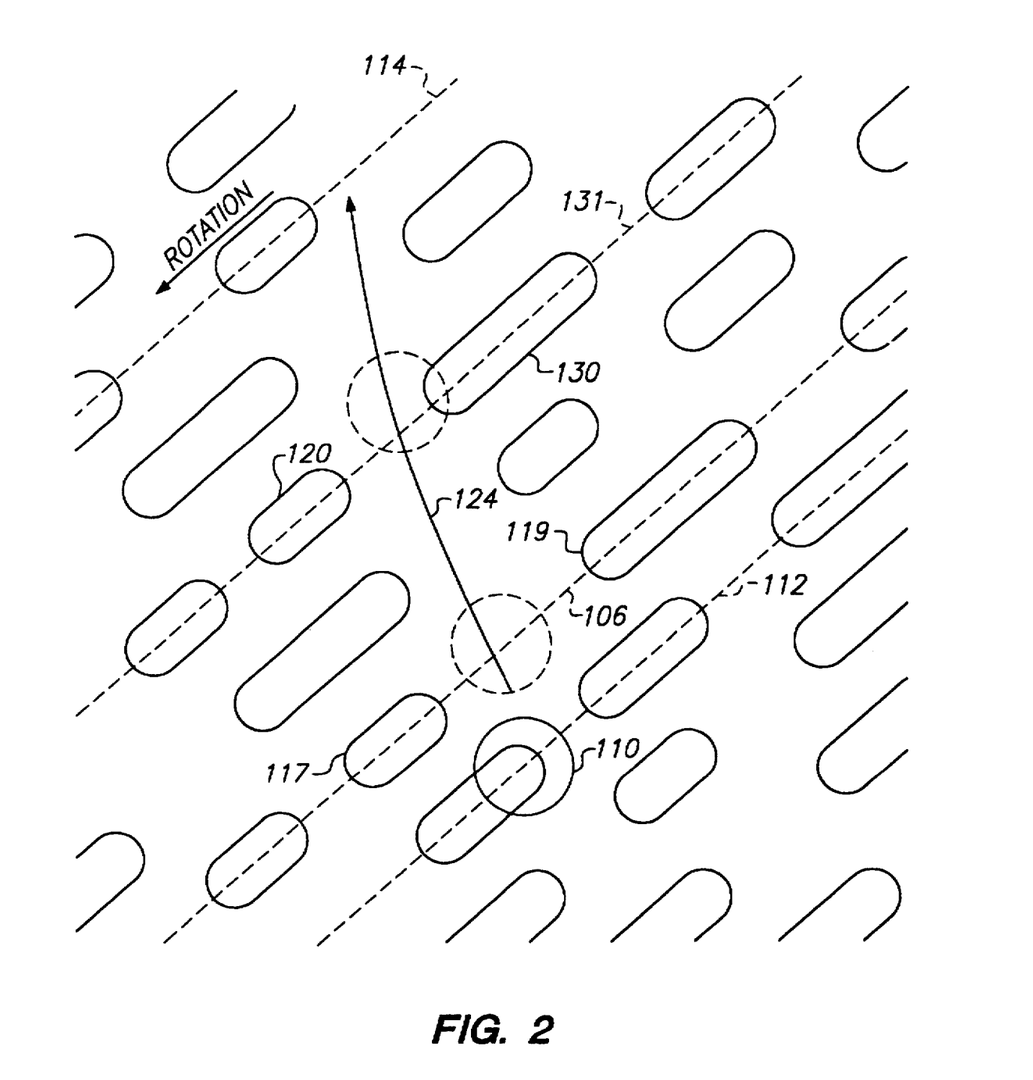
FIG. 2 shows a previously known head used for counting tracks of a CD-ROM disk.

Referring now to FIG. 2, difficulties encountered when using previously known counting methods for optical drives are described. Let it be assumed that it is desired to access data by repositioning of the head from track 112 to track 114. Movement of the head relative to disk 100 is measured by counting the tracks that are crossed during repositioning of the head.

Typically, the land area between adjacent pits is indistinguishable from the land area between adjacent tracks, so that the optical reader can only sense a track by sensing a pit. As shown with respect to FIG. 2, disk 100 is rotating with a varying angular velocity, so that imaged area 110, follows path 124 between tracks 112 and 114. As imaged area 110 crosses track 106, it does not intersect with either pit 117 or 119 of track 106, and therefore track 106 is not sensed by the optical drive.

Similarly, overlap of imaged area 110 with pit 130 of track 131 may be insufficient to determine the presence of pit 130 and thus track 131 will also not be counted. Since tracks 106 and 131 may not be detected by the optical drive, the track count will be erroneous, and the head will move pass target track 114.

Figure 3A:
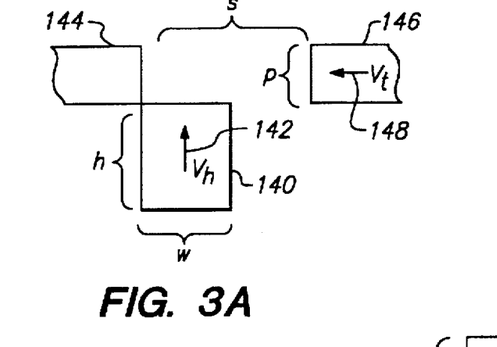
FIGS. 3A and 3B illustrate relative motion between a disk drive head and pits on the surface of a disk.
Figure 3B:
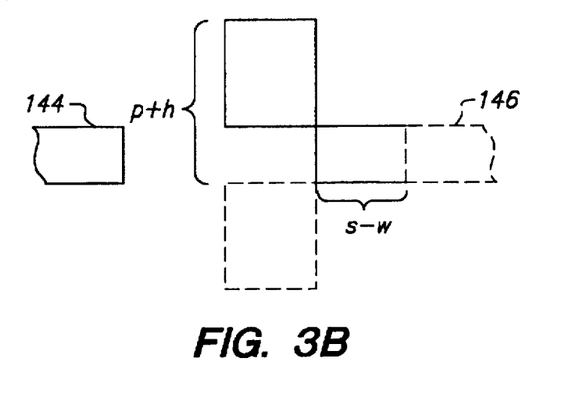

Referring to FIGS. 3A and 3B, a relationship between the speed of the head and the speed of the pits rotated by the head is derived. For simplicity, pits 144 and 146 are assumed to be rectangular in shape with width p and separation s, while sensed area 140 is similarly assumed to be rectangular with width w and height h. Imaged area 140 is moving at speed $V_i$ as denoted by vector 142, while pits 144 and 146 are moving at speed $V_p$ denoted by vector 148.

In FIG. 3A, pit 144 has just passed by the head and is thus missed by imaged area 140, while in FIG. 3B, imaged area 140 had already crossed ahead of, and therefore will not sense, pit 146. In the interval illustrated in FIGS. 3A and 3B, the motions of imaged area 140 and pit 146 are given by:

$$V_i=(p+h)/t, \text{ and} \qquad (1)$$

$$V_p = (s-w)/t. \quad (2)$$

Combining (1) and (2) yields:

$$V_i/V_p = (p+h)/(s-w) \quad (3)$$

It is therefore seen that if the head moves faster, or the disk is rotated more slowly, imaged area 140 will miss pit 146 by a wider margin. Accordingly, the right side of equation (3) must be less than the left for imaged area 140 to detect pit 146, that is:

$$V_i \geq V_p \cdot (p+h)/(s-w). \quad (4)$$

While the values for p and s are fixed by the format of the optical disk, $V_p$, h, and w may each be increased so that the speed at which the head moves across the disk, $V_i$, may also be increased. Increasing the rotational speed $V_p$ of optical disk is per se known as a method of increasing the data transfer rate of an optical drive, however, such a modification requires more stringent design tolerances in the optical, mechanical, and electronic systems of an optical disk reader.

Figure 4:
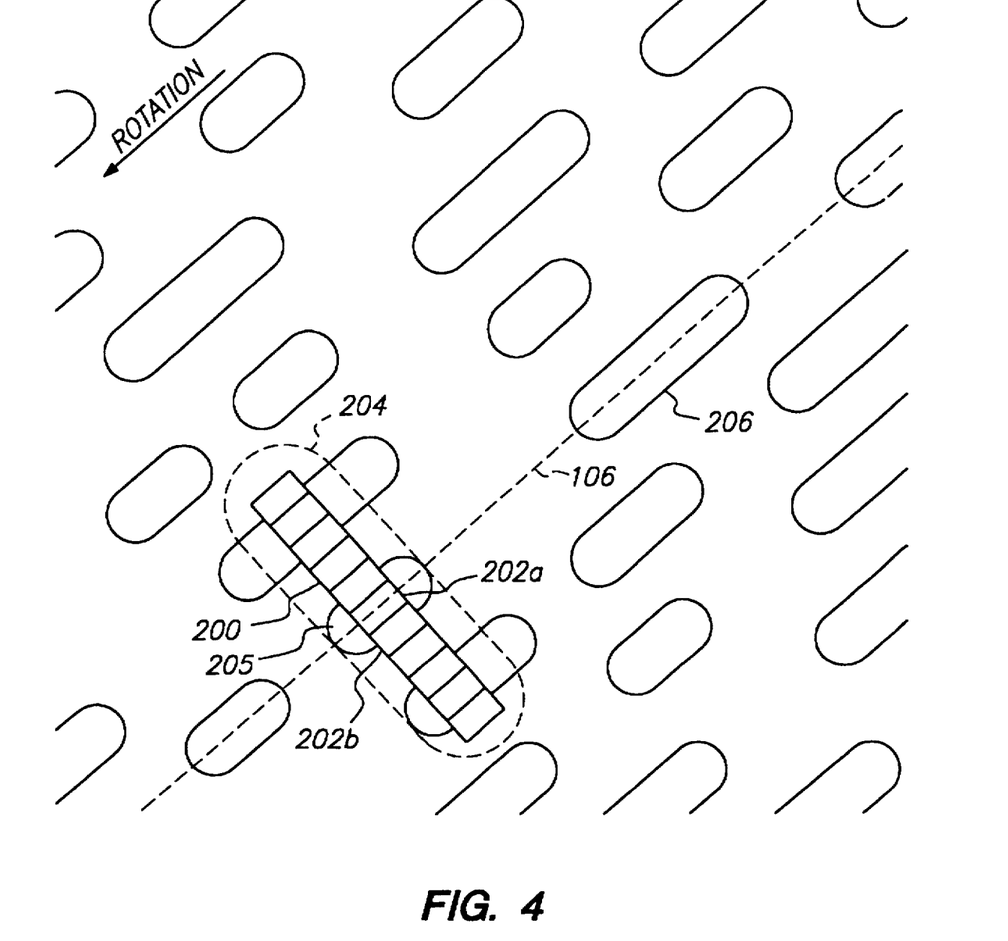
FIG. 4 is an illustrative embodiment of a detector for track counting in a accordance with the principles of the present invention.

Referring now to FIG. 4, detector 200 for use in an improved access time counting scheme in accordance with the methods of the present invention is described. Detector 200 comprises the portion of an optical drive pickup head onto which imaged area 204 is projected. Detector 200 comprises an array of track sensing elements 202 which may be, for example, photodiodes, or pixels in a charge-coupled device (CCD).

Detector 200 effectively has a height that is much larger than the width of a single pit (i.e. h>p), thus ensuring that at least one pit from each track is sensed by an element 202 of detector 200 before the detector moves beyond the track. For example, as disk 100 rotates in the direction shown, pit 206 crosses into a portion of sensed area 204 before detector 200 moves past track 106. As will be appreciated, a track can only be missed if no pits pass through sensed area 204.

Detector 200 provides one or more output signals corresponding to the intensity of the reflected illumination, or other characteristic representative of the disk image being sensed. If elements 202 comprise photodiodes, the output of detector 200 may comprise a number of parallel analog signals. A detector matrix suitable for use with the methods of the present invention is described, for example, in commonly assigned U.S. Pat. No. 5,426,623, which is incorporated in its entirety herein by reference.

Output signals from detector 200 may be analyzed to determine which of elements 202 are sensing tracks, and which are sensing land areas between the tracks. In particular, by processing the output signals from detector 200, the optical drive can determine which signals correspond to the sensing of data pits, i.e. tracks, on the disk. Because the correspondence between signals and sensing elements is known, the positions of tracks relative to detector 200 may be determined from the sensing element signals.

For example, if elements 202 have a pitch that is approximately one-quarter the width of the track, the tracks may be counted using every fourth element. Thus, sensing tracks based on the average of the elements is expected to provide a track count that is more likely accurate than that obtainable using a single element 202.

Referring again to FIG. 4, as detector 200 moves across track 106, the pits of track 106 are detected in sequence by various ones of sensing elements 202. For example, sensing element 202a may sense pit 205 on track 106, and pit 206 will again be sensed by sensing element 202b. Because the speed and direction of head is known, or can be calculated, the sensing of a track by different sensing elements 202 may be correlated to provide an accurate count of the track crossings. For example, based on the time between sensing pit 205 by element 202a and sensing pit 206 by element 202b, the velocity of detector 200 may be determined.

While the dimensions of detector 200 illustrated in FIG. 4 are preferably selected such that every fourth sensing element is positioned on a track center, at least a minimum of two track sensing elements 202 per track is required. Increasing the number of track sensing elements 202 provides finer resolution, but may also require additional processing and illumination capabilities.

Figure 5:
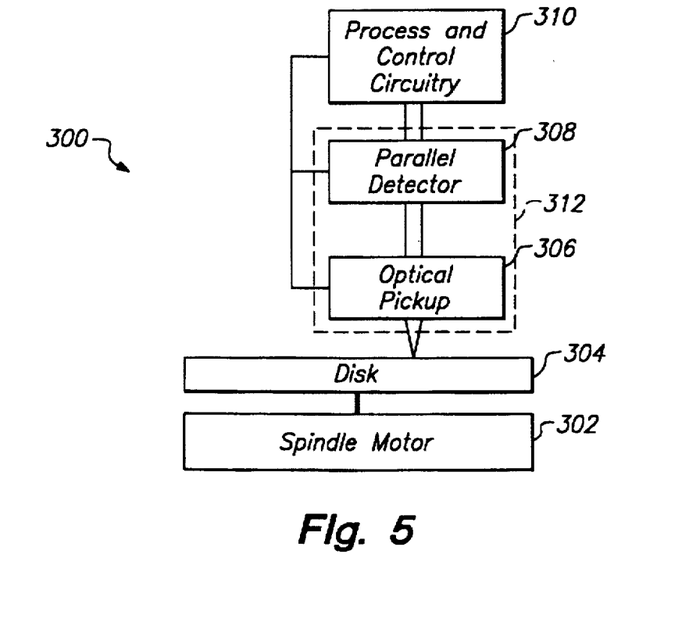
FIG. 5 shows a block diagram of an optical disk drive embodying to the present invention.

Referring now to FIG. 5, an illustrative block diagram of an optical drive 300 constructed in accordance with the present invention is described. Optical drive 300 includes conventional spindle motor 302 that rotates optical disk 304, pickup head 312 and process and control circuitry 310. Pickup head 312 comprises parallel detector 308 and optical system 306, which projects an image of a portion of disk 304 onto parallel detector 308. Parallel detector 308 senses the intensity of light from the disk image and outputs signals to processing and control circuitry 310.

Other than the presence of parallel detector 308, head 312 may be of generally conventional construction. Parallel detector 308 may include a line of track sensing elements, as illustrated in FIG. 4, but includes at least two independent sensing elements that can simultaneously and independently sense different disk locations.

Optical system 306 is also generally of conventional design, comprising an objective lens, a detector lens, a beam splitter and an illumination source. However, unlike conventional illumination sources that illuminate only a single track, the illumination source employed in optical system 306 includes the capability to illuminate the multiple tracks spanned by parallel detector 308. A suitable illumination source is described, for example, in copending, commonly assigned U.S. patent application Ser. No. 08/315,432, now U.S. Pat. No. 5,566,159, issued Oct. 15, 1996 which is incorporated herein by reference. In one preferred embodiment of the present invention, optical system 306 employs a split optics to reduce the weight and inertia of head 312, thereby further improving access time.

Processing and control circuitry 310 preferably includes a microprocessor system and software, but alternatively, may comprise a logic circuit. Circuitry 310 determines which portion of disk 304 is presently to be imaged and in which direction head 312 must move to access target data. Additionally, circuitry 310 provides control signals to the servo mechanisms (not shown) that position head 312 and processes the output signals from detector 308 as head 312 is repositioned, to count tracks and to determine when head 312 has reached it target position.

Processing and control circuitry 310 may use any one of a variety of methods to process the output signals from parallel detector 308 to determine whether each sensing element 202 senses a pit or a land. In one preferred embodiment circuitry 310 compares the output signals from detector 308 to a threshold value. For example, if the output signal is above the threshold, it can be reliably deemed that the particular sensing element sensed a land, while if the output signal falls below the threshold, it can be reliably deemed that the particular sensing element sensed a pit.

In an alternate embodiment, circuitry 310 determines whether each sensing element has sensed a pit or a land by comparing the output from each sensing element to the output from a nearby sensing element. Nearby sensing elements may be either directly adjacent or separated by one or more other sensing elements, depending upon such factors as the particular type of detector, the sensing element dimensions, the particular type of disk and the disk format. In accordance with this method, for example, when the difference between the output signals from nearby sensing elements differs by more than a predetermined threshold, it is deemed that the sensing elements with the lower value has sensed a pit.

Embodiments constructed in accordance with the present invention may use a variety of methods to assure that parallel detector 308 senses, and circuitry 310 counts, each track. In one preferred embodiment, circuitry 310 monitors consecutive sensing elements so that, at the highest and lowest speed at which head 312 may be repositioned, one of the monitored consecutive sensing elements should sense a pit from each track.

To improve the reliability of the drive and make it less susceptible to counting errors arising from the presence of dirt, scratches, or other surface imperfections, detector 200 could employ more track sensing elements 202. For example, referring again to FIG. 4, if several sensing elements before sensing element 202a had reached track 106, at least one or all of them may have sensed pit 205. The optimum number of track sensing elements 202 depends, for a particular application, on factors such as cost, desired accuracy, and disk format.

Processing and control circuitry 310 preferably uses several consecutive sensing elements to count the tracks. Alternatively, only selected ones of consecutive sensing elements may be sampled. For example, the fact that a data pit must have a length of at least 0.9 um in the CD-ROM format suggests that circuitry 310 should not skip so many consecutive sensing elements that data pits having the minimum length could be passed over without being detected. Accordingly, the number of sensing elements that can be skipped will depend on the speed of head 312 and the detector dimensions.

Figure 6:
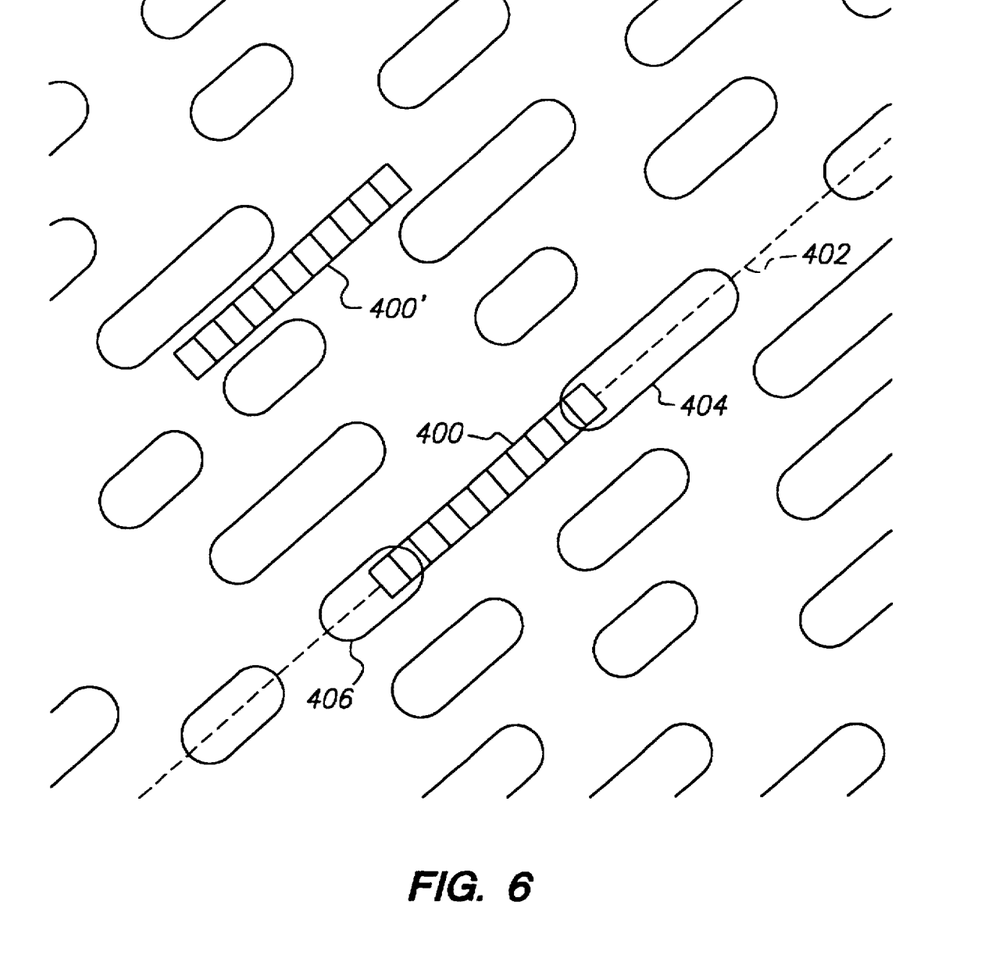
FIG. 6 is an alternative embodiment of a track counting detector constructed in accordance with the present invention.

Referring now to FIG. 6, an alternative illustrative embodiment of the present invention is described, in the context of a CD-ROM drive. Detector 400 comprises a column of track sensing elements that extend tangentially along a track, so that detector 400 has a length that is greater than or equal to the maximum distance between pits. Thus, detector 400 cannot cross a track without sensing at least one pit. On the other hand, detector 400 should not be so long in the tangential direction that it crosses adjacent tracks due to the curvature of the tracks.

As shown in FIG. 6, track 402 has two pits 404 and 406 spaced the maximum distance apart (i.e., 3.3 um on a typical CD-ROM disk). The track sensing elements of detector 400 should sense at least one of the pit 404 or 406, because the effective length of detector 400 is longer than the maximum inter-pit spacing. Thus, for example, the length of detector 400 might be 200 um.

Detector 400 may comprise multiple sensing elements, or alternatively, may comprise a single elongated track sensing element. If the length of a single sensing element is sufficiently long, it is expected that detector 400 will provide reliable and accurate track counting. In this regard, it is required only that detector 400 be capable of sensing, as opposed to reading, the data contained on the disk.

As will be appreciated, reading data requires that the sensing elements of the detector be shorter than the minimum pit length. Consequently, use of detector 400 to perform a track access function may require use of another detector to actually read the data after a seek has been performed.

Figure 7A:
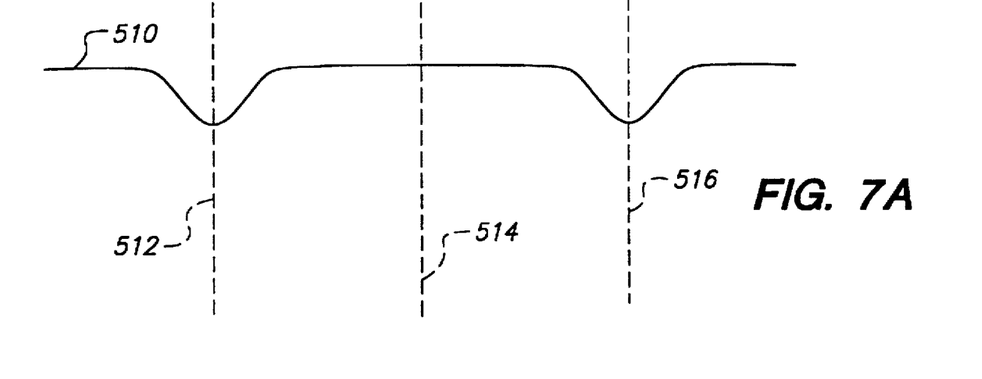
FIGS. 7A–C illustrate waveforms, each of which may correspond to the output of an individual sensing element from a detector suitable for use with the present invention.
Figure 7B:
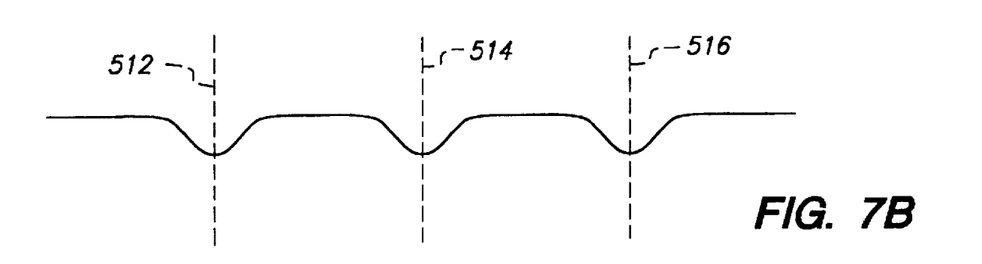
Figure 7C:
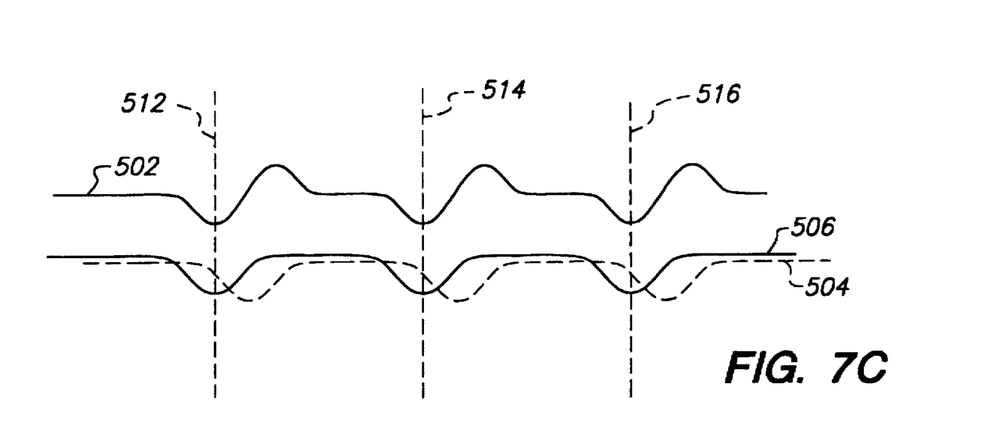

Referring now to FIGS. 7A to 7C, illustrative waveforms are described such as may be output by a relatively short individual sensing element, detector 400 of FIG. 6, and detector 200 of FIG. 4, respectively. The output of an individual sensing element is illustrated as time-varying waveform 510 of FIG. 7A, corresponding to the output signal generated by crossing three tracks, the centers of which correspond to the vertical lines 512, 514 and 516. As shown by the absence of a minimum at the center of track 514, the sensing element crossed track 514 without sensing a pit.

FIG. 7B illustrates the output from detector 400 of FIG. 6 as a time-varying waveform such as waveform 520. As described hereinabove, detector 400 senses every track at it passes over, so that waveform 520 corresponding to the output signal of detector 400 has minima corresponding to all three of tracks 512, 514 and 516.

FIG. 7C illustrates the output signal resulting from detector 200 after processing by processing and control circuitry 310, where the output signals from respective sensing elements of the detector are compared to each other, as described hereinabove. This scheme is expected to produce a signal such as time-varying signal 502, derived by subtracting signal 504 from signal 506. Signals 504 and 506 are phase shifted from each other in FIG. 7C because the locations of their respective sensing elements are not coincident. As described hereinbelow, this phase shift can be used to detect track direction.

Although generally not necessary to the accuracy of the track counting methods, the foregoing embodiments of the present invention can determine the exact location of a sensing element with respect to each track image by processing the signal output by the detector. For example, the locations of signal maximums (or minimums) may be determined, whether the signal represents an output from an individual sensing element or the difference of two sensing elements ("difference signal").

This information about the track location may also be used to determine and monitor the speed at which head 312 is moving, for example, or to avoid errors caused by disk eccentricity. Processing and control circuitry 310 may be used to estimate the exact position of each maximum (or minimum) to sub-sensing element accuracy using interpolation. Such techniques are suitable for use in conjunction with the track locating methods and apparatus are described, for example, in commonly assigned U.S. Pat. No. 5,426,623 and in co-pending, concurrently filed and commonly assigned U.S. patent application Ser. Nos. 08/559,778 and 08/559,419, which are incorporated herein by reference.

Figure 8A:
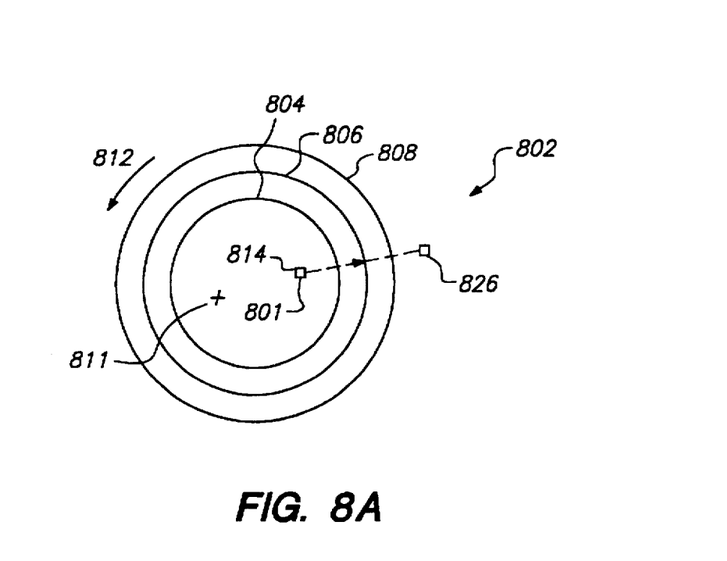
FIGS. 8A and 8B depict the effects that disk eccentricity may have on counting tracks while repositioning the head of an optical disk reader.
Figure 8B:
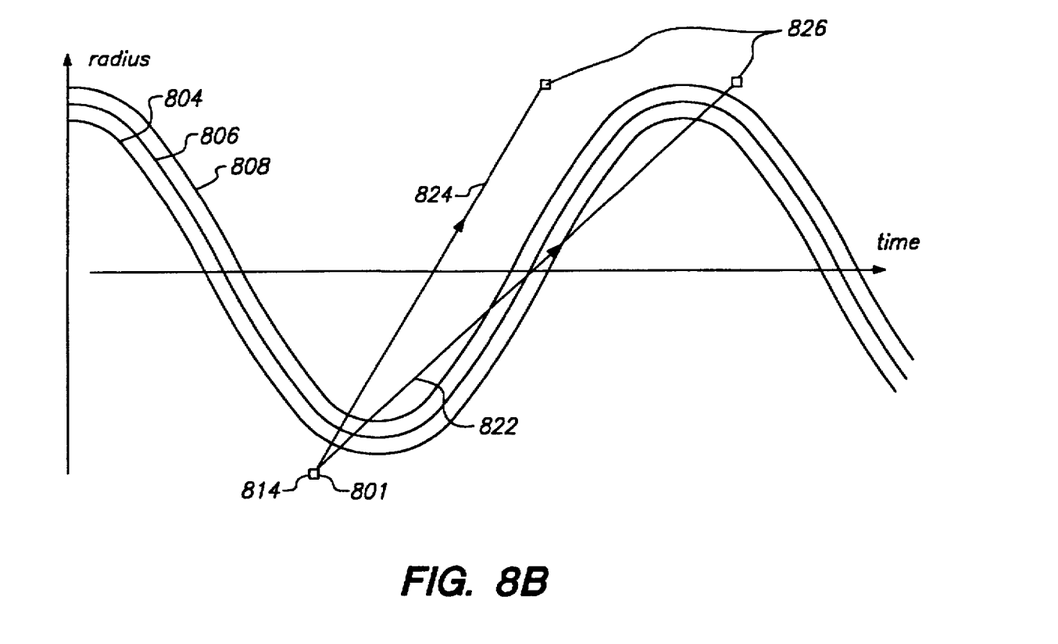

Referring now to FIGS. 8A and 8B, application of the principles of the present invention to reduce counting errors caused by disk eccentricity is described. Head 801 is shown moving between positions 814 and 820 above rotating disk 802 having eccentric tracks 804, 806 and 808. Disk 802 rotates in the direction of the arrow 812 about center 811 (the distortion of disk 802 is exaggerated for purposes of illustration).

The eccentricity of disk 802 causes the time-dependent radius of a track to appear sinusoidal. Thus, for example, if head 801 is to be repositioned from position 814 to target position 826 to perform a seek, FIG. 8B illustrates the position of the head with respect to disk tracks 804, 806 and 808 at different points in time during the seek.

Line 822 represents the radial path of head 801 with respect to disk tracks 804, 806, and 808 if head 801 travels at a first, relatively slow, seek velocity, whereas line 824 represents the path of head 801 if the head travels at a second, faster, seek velocity. As disk 802 rotates, head 801 re-crosses tracks 804, 806 and 808 multiple times as it moves along path 822. However, at a higher seek velocity, as illustrated by path 824, head 801 may reach the target position 826 without re-crossing any of tracks 804, 806 or 808. Accordingly, the apparatus and methods of the present invention enable disk seek velocities to be increased sufficiently with respect to disk angular velocity so as to limit the impact of disk eccentricity.

Figure 9A:
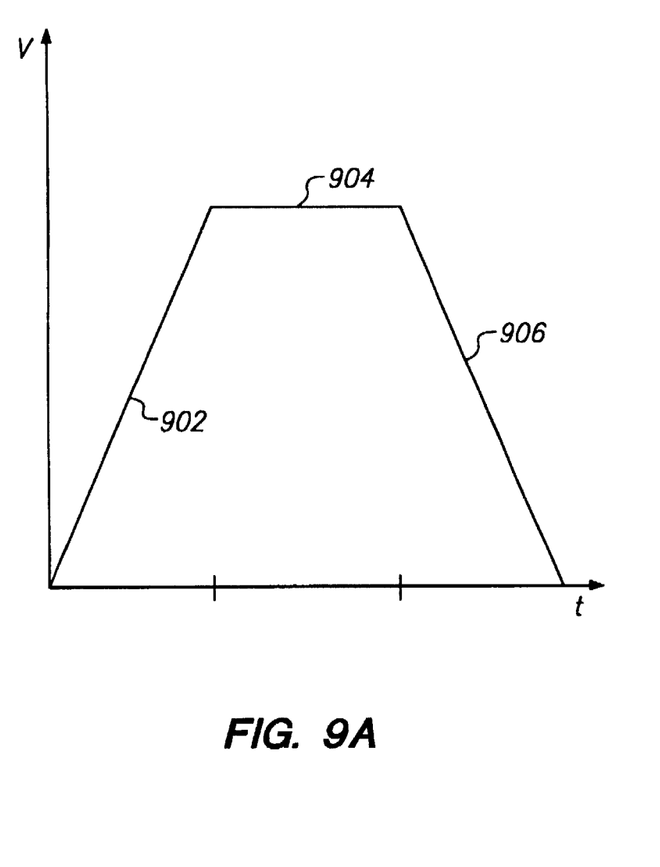
FIGS. 9A and 9B illustrate possible speed versus disk distance profiles for some embodiments of the invention.
Figure 9B:
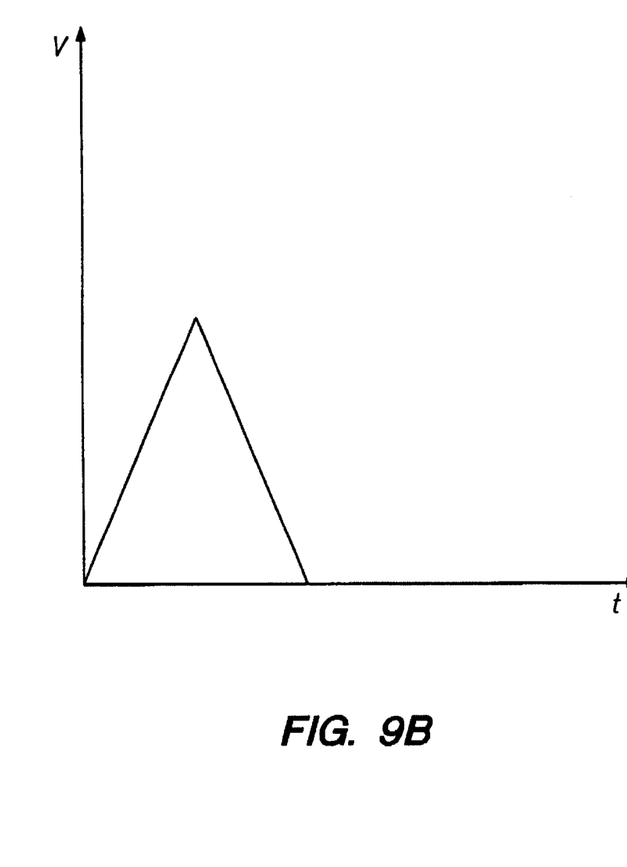

Further in accordance with the present invention, additional methods are provided for compensating for eccentricity during ramp up to and ramp down from high velocities. Referring to FIGS. 9A and 9B, illustrative head velocity profiles are described. In FIG. 9A, the head velocity 902 initially ramps up. If the distance between the initial and target tracks is sufficiently large, the head may reach a constant maximum velocity 904, which may be selected to minimize counting errors due to eccentricity, as described hereinabove. Finally, the head velocity 906 ramps down as the target position is approached.

While accelerating and decelerating, portions 902 and 906 of the velocity profile, the seek velocity may not be sufficient to avoid counting errors in the manner described. Additionally, for seeks involving a shorter distance, the head may not have time to reach a constant velocity, as shown in FIG. 9B. Accordingly, processing and control circuitry 310 may compensate for such counting errors under these circumstances using direction detection techniques.

As described hereinabove with respect to FIG. 7C, detector 200 of the present invention may be used to detect direction by comparing the output signals from two sensing elements of the detector, as indicated by the phase difference between them. Circuitry 310 may monitor this relative phase difference to detect when the head changes direction relative to the disk image.

For example, referring again to FIG. 7C, when a head starts a seek, signal 504 may lead signal 506, so that signal 502 first goes low and then high. However, if signal 506 leads signal 504, signal 502 will first go high and then low. Thus circuitry 310 can determine the direction of motion of head 312 relative to the disk tracks. Monitoring direction with respect to the disk image in this manner provides another mechanism to increase the likelihood of an accurate count.

Still other techniques may be used to increase disk access speed by reducing the average latency of the disk drive. For example, as described in concurrently filed, co-pending and commonly assigned U.S. patent application Ser. No. 08/559,429, multiple tracks simultaneously may be read in parallel and cached in an memory buffer. If a subsequent reads request data that was previously read and cached, the resulting access time will be the much shorter.

While conventional optical disks store data serially in a single continuous spiral track, data alternatively could be stored in a parallel fashion, wherein each bit of a data word is stored on adjacent tracks. Using a modified version of the parallel track reading apparatus of the aforementioned U.S. patent application Ser. No. 08/559,429, the bits of a data word may be read in parallel, thereby further increasing the data transfer rate of the optical drive. For example, by spreading the bits of an eight bit byte across eight adjacent tracks and reading the eight bits simultaneously, the data access speed of the drive may be effectively increased eightfold with no increase in disk rotational speed.

The foregoing descriptions of specific embodiments are provided only for illustrative purposes; various modifications to the described embodiments will be readily apparent to those skilled in the art, and the generic principles defined herein may be applied to other embodiments and applications without departing from the spirit and scope of the invention.

What is claimed is:

1. Apparatus for accessing data stored on a disk, wherein the data is stored as detectable features forming tracks on the disk, the disk being rotated, the apparatus comprising:
   a detector for providing a signal representative of data sensed within a track on the disk, the detector having a length and orientation;
   first means for moving the detector in a substantially radial direction relative to the disk; and
   circuitry coupled to the first means and the detector for directing the first means to move the detector between a first position over a first track and a second position over a second track, the circuitry processing the signal from the detector to determine when the detector has reached the second position by counting the tracks over which the detector passes while moving from the first position to the second position, wherein the effective length of the detector is greater than a maximum distance separating adjacent ones of the detectable features.

2. The apparatus as defined in claim 1 wherein the detector comprises a plurality of sensing elements.

3. The apparatus as defined in claim 2 wherein the plurality of sensing elements comprises a linear array.

4. The apparatus as defined in claim 1 wherein the detector is oriented in a direction substantially radial to the tracks.

5. The apparatus as defined in claim 1 wherein the detector is oriented in a direction substantially tangential to the tracks.

6. The apparatus as defined in claim 2 wherein the sensing elements comprise either photodiodes or pixels of a charge-coupled device.

7. The apparatus as defined in claim 1 wherein the maximum distance separating adjacent detectable features is measured in a direction corresponding to the orientation of the detector.

8. The apparatus as defined in claim 2 wherein the circuitry processes the signal to determine the presence of a track by subtracting a signal from a first sensing element from a signal from a second sensing element near the first sensing element.

9. The apparatus as defined in claim 8 wherein the circuitry determines the direction of movement of the sensing element relative to the disk tracks by determining a phase relationship between the signals from the first and second sensing elements.

10. The apparatus as defined in claim 8 wherein the circuitry determines a velocity of the detector by measuring the time taken for the detector to move between adjacent tracks.

11. Apparatus for positioning a head in a disk drive from a first position for sensing a first track to a second position for sensing a second track, wherein the tracks comprise data recorded as a series of detectable features oriented along the tracks, the apparatus comprising:
   a detector having at least one dimension that is greater than a maximum distance separating adjacent detectable features, the detector generating a signal responsive to sensing the presence or absence of a detectable feature on the disk;
   first means for moving the head; and
   circuitry coupled to the detector and the first means for:
   calculating the number of tracks between the first track and the second track;
   directing the first means to move the head from the first position in a direction toward the second position;

processing the signal generated by the detector to determine the presence or absence of a track on the disk;

counting the number of tracks determined by the processing of the generated signals; and directing the first means to stop moving the head when the counted number of tracks is approximately the same as the calculated number of tracks between the first and second tracks.

12. The apparatus as defined in claim 11 wherein the detector comprises a plurality of sensing elements arranged so that a distance from at least one sensing element to at least one other sensing element is greater than the maximum distance separating adjacent detectable features.

13. The apparatus as defined in claim 12 wherein the plurality of sensing elements comprises a linear array oriented in a substantially tangential direction relative to the tracks.

14. The apparatus as defined in claim 12 wherein the plurality of sensing elements comprises a linear array oriented in a substantially radial direction relative to the tracks.

15. The apparatus as defined in claim 14 further comprising circuitry for determining a direction of motion of the head relative to the tracks by determining a phase relationship between signals from nearby sensing elements.

16. The apparatus as defined in claim 11 wherein the detector comprises a sensing element having an effective length greater than the maximum distance between successive detectable features within a track.

17. The apparatus as defined in claim 14 wherein the detector comprises a plurality of sensing elements, the detector has an effective length greater than the maximum distance between detectable features in adjacent tracks.

18. A method for accessing data stored on a disk, wherein the data is stored as detectable features in tracks on the disk and the disk is rotated, the method comprising steps of:

sensing a surface of the disk with a detector having an effective length greater than a maximum separation between adjacent detectable features;

generating signals responsive to sensing the presence of the detectable features on the disk;

moving the detector in a substantially radial direction relative to the disk from a first position to a second position; and processing the signals to count the tracks over which the detector passes while being moved from the first position to determine when the detector has reached the second position.

19. The method as defined in claim 18 wherein the step of sensing the surface of the disk comprises using an array of sensing elements to sense the surface of the disk at a plurality of locations.

20. The method as defined in claim 19 further comprising the step of orienting the array in a direction substantially radial to the tracks.

21. The method as defined in claim 19 further comprising the step of orienting the array in a direction substantially tangential to the tracks.

22. The method as defined in claim 19 wherein the step of processing the signals further comprises a step of determining a difference between a signal from a first sensing element in the array and a signal from a second sensing element in the array neighboring the first sensing element.

23. The method as defined in claim 19 wherein the step of processing the signals further comprises a step of determining a direction of movement of the detector relative to the tracks by determining a phase relationship between signals from the first and second sensing elements in the array.

24. The method as defined in claim 18 further comprising a step of determining a velocity of the detector by measuring the time taken for the detector to be moved between adjacent tracks.

25. A method of positioning a head in a disk drive from a first position for sensing a first track to a second position for sensing a second track, wherein the tracks comprise data recorded as a series of detectable features oriented along the tracks, the method comprising steps of:

providing a detector having at least one dimension that is greater than a maximum distance separating adjacent detectable features along a track, the detector sensing the presence or absence of a detectable feature on the disk;

determining the number of tracks between the first track and the second track;

moving the head from the first track in the direction of the second track;

generating a signal responsive to the detector sensing the presence or absence of a detectable feature;

processing the generated signal to determine the presence or absence of a track on the disk;

counting the number of tracks determined by the processing of the generated signals; and stopping the movement of the head when the counted number of tracks is approximately the same as the number of tracks between the first and second tracks.

26. The method as defined in claim 25 wherein the step of providing a detector further comprises a step of arranging a plurality of sensing elements so that a distance from at least one of the sensing elements to at least one other sensing element is greater than the maximum distance separating the adjacent detectable features.

27. The method as defined in claim 26 wherein the step of arranging the plurality of sensing elements includes arranging the plurality of sensing elements in a linear array oriented in a substantially tangential direction relative to the tracks.

28. The method as defined in claim 26 wherein the step of arranging the plurality of sensing elements includes arranging the plurality of sensing elements in a linear array oriented in a substantially radial direction relative to the tracks.

29. The method as defined in claim 28 further comprising a step of determining a direction of motion of the head relative to the tracks by determining a phase relationship between signals from neighboring sensing elements.

* * * * *